United States Patent
Love

(10) Patent No.: US 6,554,616 B1
(45) Date of Patent: Apr. 29, 2003

(54) BILINGUAL DOLL

(75) Inventor: Tru Love, Palo Alto, CA (US)

(73) Assignee: Fluent Baby, Inc., Palo Alto, CA (US)

( * ) Notice: Subject to any disclaimer, the term of this patent is extended or adjusted under 35 U.S.C. 154(b) by 0 days.

(21) Appl. No.: 09/737,979

(22) Filed: Dec. 14, 2000

(51) Int. Cl.[7] .......................... G09B 19/06; G09B 19/08
(52) U.S. Cl. ...................... 434/157; 434/167; 434/169; 434/309; 446/297
(58) Field of Search .................. 434/156, 157, 434/167, 169, 309, 393, 219, 226; 446/297, 300, 301

(56) References Cited

U.S. PATENT DOCUMENTS

| | | | | |
|---|---|---|---|---|
| 1,926,139 A | * | 9/1933 | Browne | |
| 3,593,433 A | * | 7/1971 | Dillon et al. | ................ 434/178 |
| 3,636,655 A | * | 1/1972 | Porter et al. | ................ 369/23 |
| 3,977,292 A | * | 8/1976 | Favilli | |
| 4,696,653 A | * | 9/1987 | McKeefery | |
| 5,004,442 A | * | 4/1991 | Lemelson et al. | .......... 446/268 |
| 5,607,336 A | * | 3/1997 | Lebensfeld | |
| 5,738,561 A | | 4/1998 | Pracas | .......................... 446/297 |
| 5,746,602 A | | 5/1998 | Kikinis | ........................ 434/169 |
| 5,816,821 A | * | 10/1998 | Ouellette | |
| 5,944,533 A | * | 8/1999 | Wood | |
| 6,247,934 B1 | * | 6/2001 | Cogliano | |

* cited by examiner

Primary Examiner—Jacob K. Ackun
Assistant Examiner—Bena B. Miller
(74) Attorney, Agent, or Firm—Heller Ehrman White & McAuliffe LLP

(57) ABSTRACT

This invention relates generally to the field of toy action figures, principally toy dolls and, more particularly, to dolls constructed for teaching young children specifically desired and selected words or phrases of a language other than the primary language spoken in the home. Accessories that can be used in combination with the toy for the enhanced learning of a language are also contemplated.

15 Claims, 3 Drawing Sheets

BILINGUAL DOLL

FIELD

The present invention relates generally to the field of toy action figures, principally toy dolls and, more particularly, to dolls constructed for teaching young children specifically desired and selected words or phrases of a language other than the primary language spoken in the home.

BACKGROUND

Since their inception, toy dolls or action figures have been extremely popular with children in a broad range of ages. As this popularity has grown, prior art toy dolls and action figures have become more sophisticated, incorporating circuitry in the doll itself, or in attachments for the doll, which provides audible messages or sound effects.

U.S. Pat. No. 5,816,821 is directed to Bilingual Educational Dolls. The dolls disclosed therein have a pre-recorded song with bilingual educational lyrics. The child plays and pauses the songs for pre-determined times. Then the child records their own voice in repeating the lyrics of the pre-recorded songs in a foreign language.

U.S. Pat. No. 5,746,602 discloses a PC peripheral interactive doll. This is an interactive system for teaching, entertaining, and habituating a child utilizing an interactive entity such as a doll with a bidirectional communication link to a personal computer (PC). Scripted data stored at the computer directs doll activity and verbal articulation, and utilizes response from the child through the doll to the PC in directing output to the doll. Unfortunately, many in society cannot afford a PC and thus are denied the ability to further enhance their linguistic abilities.

U.S. Pat. No. 5,738,561 discloses a doll having a microphone and sound recording device along with a sound playback device and a speaker. The doll is provided with contacts or buttons to activate the sound recording device and the sound playback device. A child may speak to the doll and record messages, which may be played back at a later time. However, because the child records their own phrases for later playback this doll fails to relate a foreign word or phrase with its English equivalent.

SUMMARY

The present invention is directed to dolls and accessories constructed for teaching young children specifically desired and selected words or phrases of a language other than the primary language spoken in the home.

In one aspect of the invention there is a doll comprising a soft body with a plurality of sensors or switches. Each individual switch, when activated, energizes a battery. The energized battery allows a pre-recorded word or phrase to be accessed and played. The word or phrase is repeated twice in a foreign language and twice in English. In a preferred embodiment, the word or phrase is related to the anatomical feature where the sensor is located. In another embodiment, the word or phrase is related to the (fabric) color overlaying the sensor. In yet another preferred embodiment, a plurality of words and/or phrases are contained on a ROM chip. In a more preferred embodiment, the plurality of sensors or switches mounted in or on the doll would always cause the same words or phrases to be spoken.

In a second aspect of the invention there is provided a house for use with a bilingual educational doll. The house has within it sensors that activate an audio playback means. Activation of a sensor allows a pre-recorded word or phrase related to the area of the house where the sensor is located to be accessed and played. In a preferred embodiment, a plurality of words and/or phrases are contained on a ROM chip.

In another aspect of the Invention there is provided a bilingual doll having an internal prerecorded speech mechanism that allows the speech phrases to be randomly accessed by the user at any time during the playing of a previous word or phrase.

In yet another aspect there is provided a bilingual doll having an internal prerecorded speech mechanism that enables the doll and its prerecorded speech to advance with the child user to more advanced speech.

In a further aspect of the invention there is provided alpha-numeric accessories. The individual letters of the alphabet and the numbers 1–20 are provided as soft bodied toys with sensors disposed therein. Activation of the sensors allows a pre-recorded word or phrase related to the letter or number to be accessed and played.

In a yet further aspect of the invention there is provided a pull string toy (900) having a pull string extending from the head through the body that is displaceable under tension between a first predetermined position and a second predetermined position. The toy (900) emits a pre-recorded word or phrase when the string is recoiled from a second position to the first position. The toy (900) body is defined by at least two accordion pleats forming a bellows region. The accordion pleats have a substantially symmetric shape and each pleat is substantially concentric around the pull string when the pull string is extended to the second position. Accordingly, the appearance of the pleats is not distorted at all positions of the pull sting.

DETAILED DESCRIPTION

The invention will now be described in detail by way of reference only using the following definitions and examples. All patents and publications referred to herein are expressly incorporated by reference.

Definitions

As used herein, the following terms or abbreviations, whether used in the singular or plural, will have the meanings indicated:

The terms "sensor," "button" and "switch" as used interchangeably herein and refer to a sensing device. The device may respond to pressure, bending, or the like.

"Foreign language" means a language other than English. Specific languages include, but are not limited to, Chinese, Portuguese, Japanese, German, Latin, Hebrew, French, Spanish, Russian, Italian, Swedish, Danish, Finnish, Norwegian, Dutch, Korean, Vietnamese, Hindi, Thai, Arabic, Czech, and Polish.

"Accessory" means various objects that may be used in conjunction with the doll that will enhance the learning experience for the child. Such items as letters and numerals, videotapes and the like, and written materials are contemplated as being encompassed within the term accessory.

"Soft-bodied" means a doll body made of materials that easily yield to pressure, as defined by Webster's II College Dictionary (1999). Sufficient materials well known in the art include, but are not limited to, plush, cotton, nylon, velvet, polyester and rubber. "Audio playback means" refers to an electronic system or speech playback mechanism, that has the capability to audibly communicating words or phrases to an end user. Examples of audio playback means, well known in the art, include a record player, cassette player, MP3 player and CD player. The audio playback means is programmed via electronic medium, such as, a record, cassette, ROM chip or CD.

The term "plurality" refers to two or more.

Figure 1:
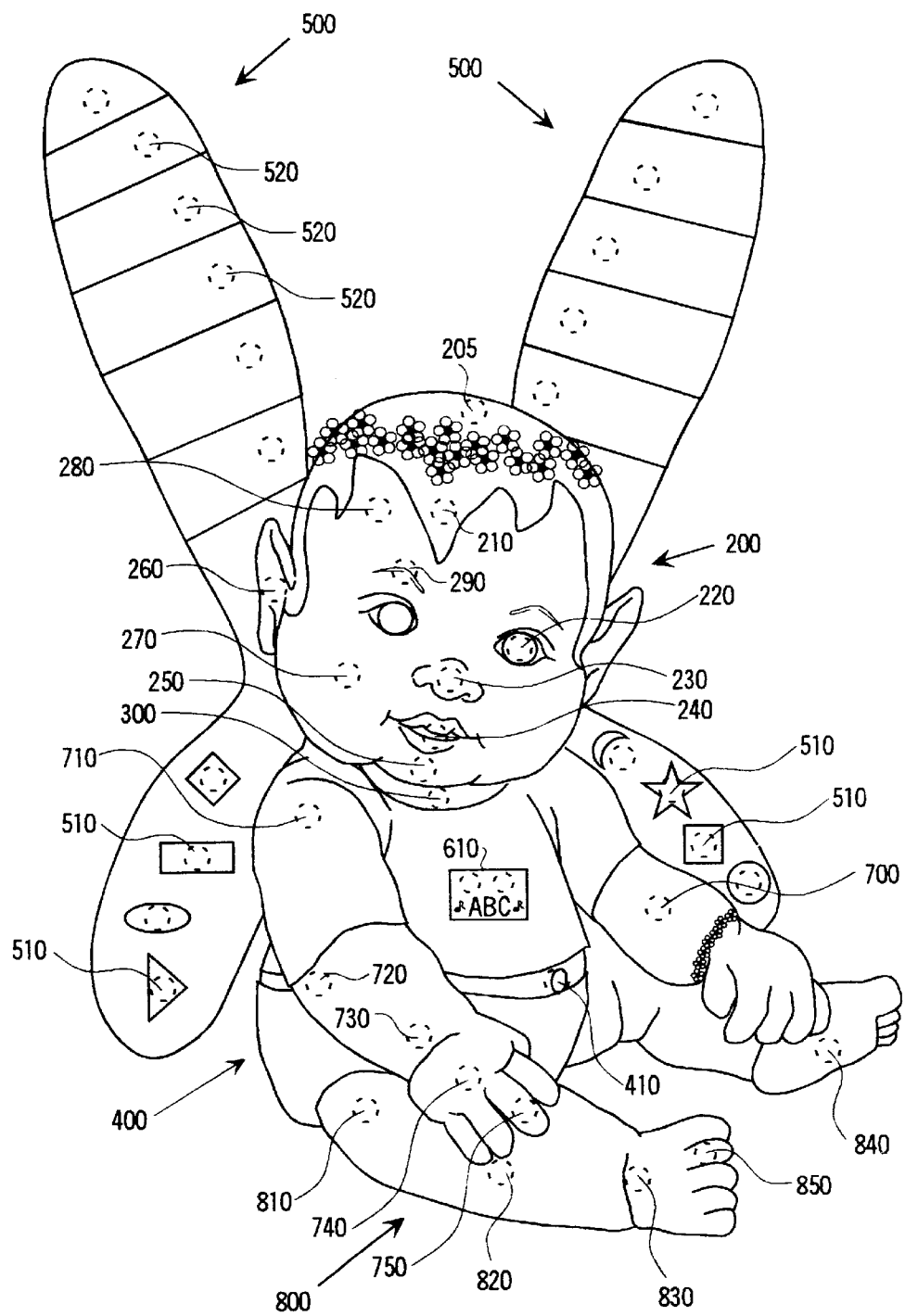
FIG. 1 is a front view of a doll of the present invention.
Figure 2:
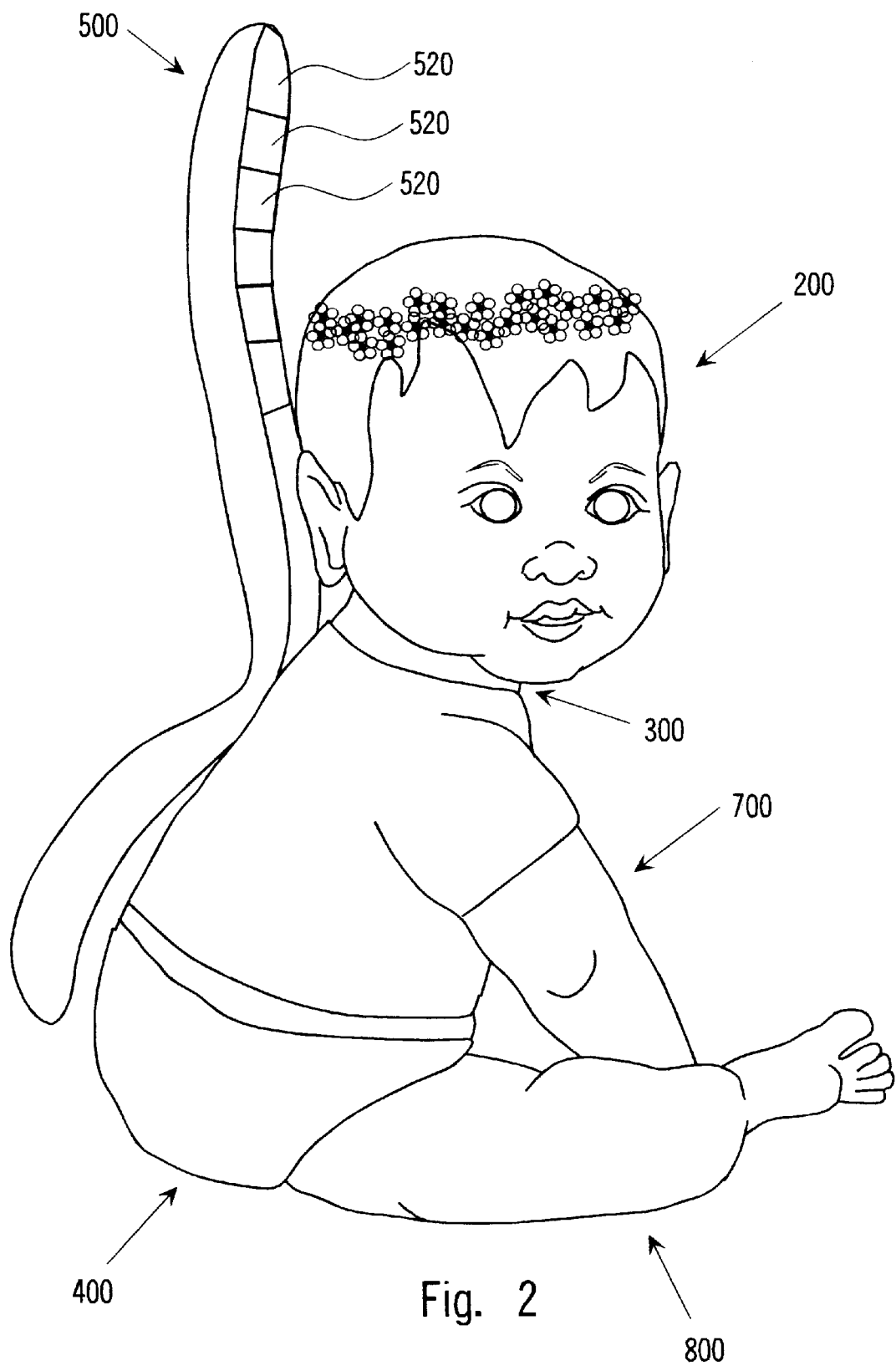
FIG. 2 is a right view of the doll of FIG. 1.
Figure 3:
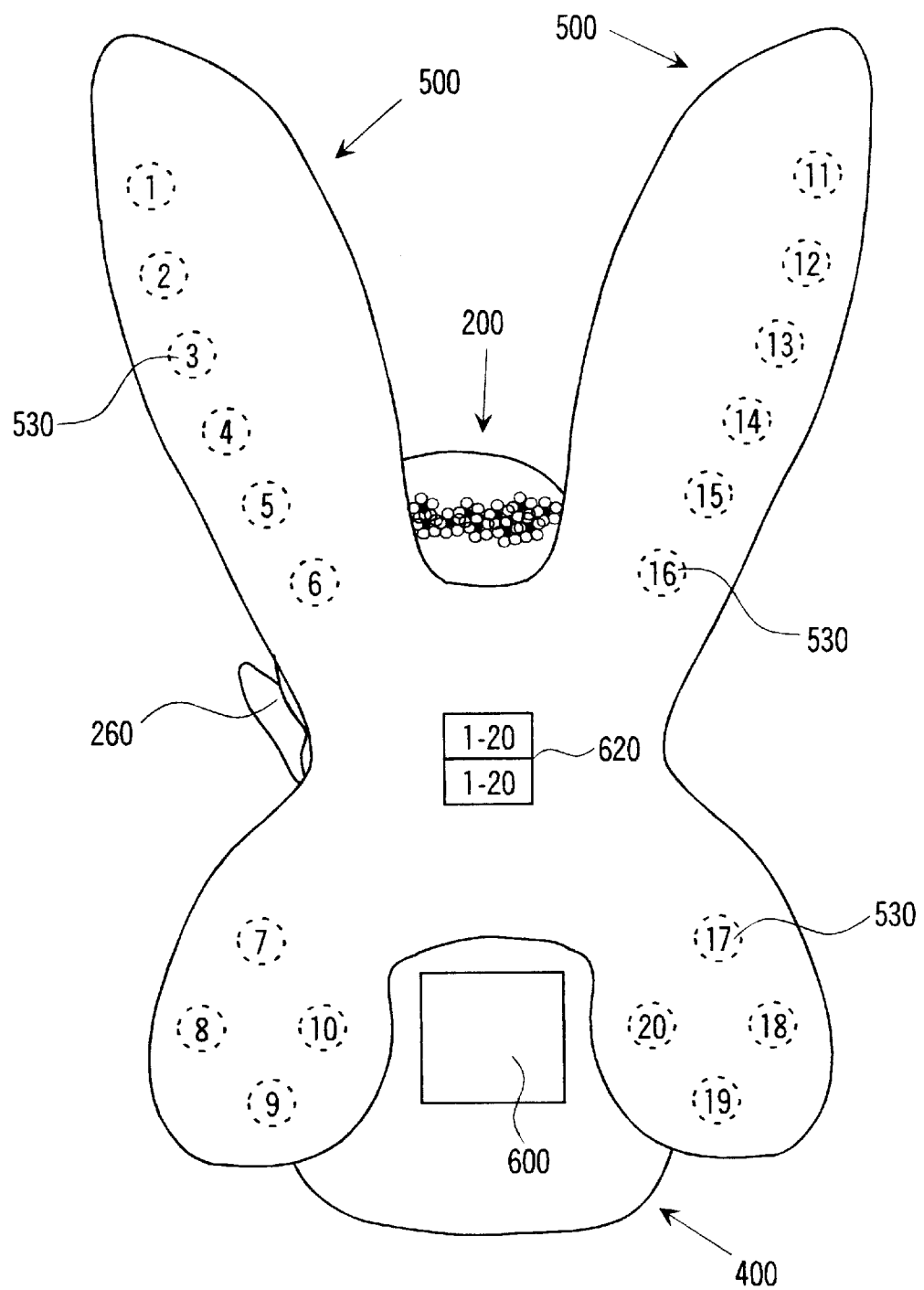
FIG. 3 is a rear elevation of the doll shown with the rear of the costume in the open position to allow insertion of batteries.

In order to best understand the construction and operation of the word/phrase bilingual doll of the present invention, reference should be made to FIGS. 1–3, along with the following detailed disclosure. As depicted therein, the preferred embodiment of specific word/phrase bilingual doll comprises an audio playback means and an audio generating circuit, collectively the audio generating system, preferably mounted in the torso (400) of the doll (100). Preferably, the front forming portion of torso (400) incorporates a plurality of apertures formed therein, behind which is mounted a speaker through which selected words and phrases enunciated by the bilingual doll (100) are transmitted for being easily heard by the user, such as a child.

The bilingual doll (100) has within it a speech mechanism comprising a microprocessor/speech synthesizer computer chip that contains thereon several prerecorded foreign language words and/or phrases and which is activated by electro-mechanical speech-activating switches that are placed near the surface of the doll's outer surface at various places, called contact points, on the doll's body, head and wing regions, each of which switches activates the speech chip to play a different one of the pre-recorded words and/or phrases through a speaker mounted within the dolls' body. The talking doll is structured so that activation of a speech-activating switch on one area of the doll will imnmediately turn the power on and play the educational speech phrase on the portion of the chip associated with the area of the doll's body or head region around the switch activated and with the particular level of play. In one embodiment the speech phrase will play even if another speech phrase is currently playing, i.e., it will supersede the earlier speech phrase, or even if the portion of the chip associated with the new speech phrase to be played is remotely located on the chip from the portion of the chip associated with the speech phrase currently playing. In another embodiment, the speech will not be interrupted.

The speech-activating switches are set beneath the doll's skin of various parts of the doll body and, especially for Mechanical switches, within the doll's head region, are set such that activating one switch by pressing onto the area around the speech-activating switch will not activate any other nearby speech-activating switch in the head region.

In an embodiment of the present invention, illustrated in FIG. 1, the doll (100) is in the form of a human infant having a body or torso (400), in the middle of which is the belly (410) and to which arms (700) and legs (800) and a head (200) are connected. The head (200) is connected to the body by way of a neck (300). At the ends of the arms (700) are hands (740) with fingers (750), and at the ends of the legs (800) are feet (840) with toes (850). On the head (260) region, the doll has hair (210), eyes (220), ears (260), cheeks (270), a nose (230), a chin (250) and a mouth (240). In FIG. 1 the speech mechanism parts of the present invention, e.g., the electro-mechanically activated switches that activate the speech mechanisms, are depicted as broken-line circles. Not shown in FIG. 1 are the microprocessor that runs the speech programs and stores the speech data, the mechanism that reproduces the speech data signals and feeds them to the speaker, and the speaker mechanism that plays the speech phrases. Any mechanism known in the art capable of storing and playing back words or phrases in response to activation may be used.

| Body Part | Reference Number |
| --- | --- |
| Doll | 100 |
| Head | 200 |
| Head Frame | 205 |
| Hair | 210 |
| Eye | 220 |
| Nose | 230 |
| Mouth | 240 |
| Chin | 250 |
| Ear | 260 |
| Cheek | 270 |
| Forehead | 280 |
| Eyebrow | 290 |
| Neck | 300 |
| Torso or body | 400 |
| Belly | 410 |
| Wings | 500 |
| Shapes | 510 |
| Colors | 520 |
| Numbers | 530 |
| Battery Access Cover | 600 |
| Alphabet Box | 610 |
| Number Box | 620 |
| Arm | 700 |
| Shoulder | 710 |
| Elbow | 720 |
| Wrist | 730 |
| Hand | 740 |
| Finger | 750 |
| Leg | 800 |
| Thigh | 810 |
| Knee | 820 |
| Ankle | 830 |
| Foot | 840 |
| Toe | 850 |
| Pull String Toy | 900 |

The internal mechanisms of the doll may be covered by any of the conventional materials used for stuffing and covering dolls. The outer surfaces or "skin" of the head (200), hands (740), and feet (840) should preferably be made from a suitable soft colored material, and the body (400), arms (700) and legs (800) should preferably be staffed with a non-flammable, polymeric fiber-fill material, such as a spun or cut polycarbonate.

Within various parts of the doll (100) are electro-mechanically activated speech-activating switches that are set beneath the doll's skin. Figure (1) also shows the placement of the speech-activating switches as broken line circles. The speech-activating switches that activate the playing of educational speech phrases appropriate for the head region are set at various places in the head frame (205), as shown in Figure (1). For example, speech-activating switches for playing speech phrases appropriate to the eye are situated within a section of the head frame (205) within the eyes (220), respectively, of the doll (100). Also, speech-activating switches playing speech phrases appropriate to the ear are situated directly on the ears (260), respectively, of the doll (100). The speech-activating switches playing speech phrases appropriate for the eyebrows are situated directly on the eyebrows (290). Similarly, speech-activating switches for playing speech phrases appropriate to the forehead, nose and mouth, respectively, are situated within sections of the head frame (200) directly on the forehead (280), nose (230) and mouth (240), respectively. Likewise, as further shown in Figure (1), speech-activating switches for playing speech phrases appropriate to the hands are set within the material that comprises the hands (740), respectively, of the doll (100). Speech activating switches for playing speech phrases appropriate to the feet are set within the material that comprises the feet (840), respectively, of the doll (100). Speech-activating switch for playing speech phrases appropriate to the belly is situated upon the navel region (410) and is set within the stuffing material that comprises the belly region (410) of the body or torso (400).

Where the anatomical feature exists bilaterally, i.e., on the left and right side of the doll, the speech activating switches may exist on one or both features/appendages. In other words, the sensor(s) which activate the speech mechanism and produce the pre-recorded word or phrases may be situated on either the left or right appendage, or there may be two sensors (one on each appendage) that activates the audio playback means. Thus, for example, the left hand, the right hand or both the left and right hand may possess a sensor. Therefore, it is to be understood that the reference numerals on the figures, while indicating a single anatomical feature does not limit the placement of the sensors to a single appendage; both appendages may have sensors for the same anatomical feature.

The doll (100) further comprises wings (500) as can be seen in FIGS. 1–3. The wings have upper and lower potions. The upper, anterior portion of the wings, as seen in FIG. 1, are multi-colored (indicated by the various patterned shading). The colors (520) include, but are not limited to, red, blue, yellow, green, purple, gray, white, pink, orange, brown and black. The order of the colors is not important. Each color has a corresponding sensor which activates the audio playback means to emit the name of the color twice in the foreign language and twice in English.

The lower, anterior portion of the wings, as seen in FIG. 1, has displayed thereon various shapes. The shapes (510) include, but are not limited to, squares, rectangles, circles, ovals, triangles, diamonds, stars and crescents. The shapes may be placed on the lower, anterior portion of the wings in any order or pattern; the shapes as shown in FIG. 1 are for illustrative purposes only. Each shape has a corresponding sensor which activates the audio playback means to emit the name of the shape, The posterior portion of the wings can be seen in FIG. 3. On the posterior wing portion are the numbers 1 through 20. The numbers (530) are displayed over a sensor such that when a child presses on the number the sensor activates the audio playback means to emit the word corresponding to the number twice in the foreign language and twice in English. The numbers may be arranged in any order but arm preferably arranged as shown in FIG. 3.

The torso (400) is uniform throughout the series with a hollow interior, (i.e., the body is filled with a polyfiber filling with sufficient room remaining for the electronic circuitry), is approximately 24 inches in height, although the height call be varied, and is shaped like a young child. The ski tone is preferably purple. The hollow interior has disposed and securely maintained therein the requisite electronic circuitry forming the audio generating system employed in the bilingual doll. Except for battery replacement, the hollow interior is securely covered, as the circuitry need not be accessed by the user. Battery replacement is easily performed by opening the battery access cover (600) on the backside of the doll (100).

On the front of the torso (400) there are two switches located within a demarcated region (610) referred to herein as the Alphabet box. The Alphabet box is preferably on the chest of the doll as shown in FIG. 1 but may be located anywhere on the doll (100) that is convenient. Activation of one of the switches within the Alphabet box will initiate the recitation of the alphabet in the foreign language while activation of the other switch will initiate the recitation in English.

On the back of the doll there are two Number Boxes (620) with a switch located within each box. The Number Boxes, as shown in FIG. 3, are preferably situated in the center of the back of the doll, however, they may be situated anywhere that is convenient Activation of a switch within one of the Number boxes will initiate the recitation of the sequence of numbers in the foreign language while activation of the other switch will initiate the recitation in English. The sequence of numbers recited may be any sequence but it preferably 1–10, more preferably 1–15 and most preferably 1–20. The sequence that is recited is indicated on the Number Box. For example, in FIG. 3, the sequence would be 1–20.

Each of the speech-activating switches may be any one of many electro-mechanical switches in the art of electrical switches but is preferably of the push-button momentary-type switch. Also, another type of sensor is one that utilizes a film having piezoelectric properties which will generate a signal when subjected to touch or other manipulation.

The doll (100) may contain a number of distinctively colored areas such that the colors yellow, black, orange, red, white, green, purple, brown and blue are all present on the doll. Furthermore, additional accessories may be used in conjunction with the bilingual doll, such as written materials, visual media or audio media.

The written material, which may take the form of a small booklet, flashcards, posters and the like, provides visual reinforcement. All printing is bilingual, written first in the corresponding foreign language then immediately followed in the English language, preferably the American English language. By following each word by word, the child becomes familiar with the written counterpart of the phonetic sounds emitted from the doll thus increasing his or her bilingual knowledge.

Visual media such as, but not limited to, videotapes, DVDs or any other visual cue may be used in conjunction with the doll.

Audio media such as, but not limited to, audio tapes, CD's, mini-disks or any other computer readable disk that are used in an appropriate piece of equipment to generate the audible sound may be used in conjunction with the doll.

Interactive accessories such as, but not limited to, numerals, letters and shapes are also contemplated and may be used in conjunction with the doll. The interactive accessories may be stuffed toys with sensors that, when activated, state twice in a foreign language and then twice in English the relevant information that corresponds with the interactive accessory. For example, a stuffed numeral five would, upon activation of the sensor, emit the pre-recorded Word for "five" twice in a foreign language and then the word "five" twice in the English language.

Alternatively, the interactive accessory may be an electronic keypad type toy with multiple images of common objects. The images overlay switches. Pressing the image activates the underlying switch and initiates a pre-recorded word or phrase to be accessed and played. The pre-recorded word or phrase corresponds to the overlying image and is said twice in a foreign language and then twice in the English language. There may also be a feature whereby the user must find a randomly picked image. Choosing the wrong image generates a prompt or clue to guide the user to the correct image. Choosing the correct image generates a sound indicating success.

Another example of an interactive accessory is a house for use with a bilingual educational doll. The house has within it sensors that activate an audio playback means. Activation of a sensor allows a pre-recorded word or phrase related to the area of the house where the sensor is located to be accessed and played. The sensors may be activated manually, as for example by physically touching the sensor, or by remote activation, e.g., radio signal activation. In a preferred embodiment, a plurality of words and/or phrases are contained on a ROM chip.

In another aspect of the invention, the multi-lingual doll may be a pull string toy (900). One example of the pull string toy (900) is represented in FIGS. 4–6. A pull string toy (900) having a pull string extending from the head through the body that is displaceable under tension between a first predetermined position and a second predetermined position. An audio playback means emits a pre-recorded word or phrase, twice in a foreign language and then twice in English, when the string is recoiled from a second position to the first position. The pre-recorded word or phrase may be accessed randomly by the user at any time during the playing of a previous word or phrase.

A toy (900) body with a pull string is defined by at least two accordion pleats forming a bellows region. The accordion pleats have a substantially symmetric shape and each pleat is substantially concentric around the pull sting when the pull string is extended to the second position. Accordingly, the appearance of the pleats is not distorted at all positions of the pull string. There is a means for pulling the string from a first predetermined position and second predetermined position. In FIGS. 4–6 the means is depicted as a rigid loop (910) although other means are also contemplated. The means for pulling may be made of any suitable material, e.g., plastic, such that it is able to withstand an infant's chewing. The toy (900) may be attached to a crib or other stationary object by ties (920). The ties may be of ribbon, string or the like.

Although the foregoing intention has been described in some detail by way of illustration and example for purposes of clarity and understanding, it will be obvious that certain changes and modifications may be practiced within the scope of the appended claims.

What is claimed is:

1. A bilingual educational toy for teaching a language comprising:
   (a) at least one sensor or switch located on a portion of said toy;
   (b) an audio playback means within a portion of said toy with a plurality of words or phrases contained thereon in a foreign language and English wherein said audio means is activated by said sensor or switch;
   (c) wings having an upper portion and a lower portion, wherein the wings have a plurality of colors selected from the group consisting of red, blue, yellow, green, purple, gray, white, pink orange, brown and black, and the sensor, having one of the plurality of colors located thereon that activates the audio playback means to emit the name of the corresponding color located on the sensor, the name of the color is said in the foreign language and in English,
   (d) a power source contained within said toy.

2. The toy according to claim 1 wherein said toy is a doll.

3. The toy according to claim 1 wherein said toy has a flexible body comprising arms, legs, torso and head.

4. The toy according to claim 1 wherein said plurality of words or phrases is repeated twice in a foreign language and twice in English.

5. The toy according to claim 1 wherein said switch is an electro-mechanical switch.

6. A bilingual educational toy for teaching a language comprising:
   (a) at least one sensor or switch located on a portion of said toy;
   (b) an audio playback means within a portion of said toy with a plurality of words or phrases contained thereon in a foreign language and English wherein said audio means is activated by said sensor or switch;
   (c) wings having an upper portion and a lower portion, wherein the wings have a plurality of shapes selected from the group consisting of squares, rectangles, circles, ovals, triangles, diamonds, stars and crescents, and the sensor, having one of the plurality of shapes located thereon that activates the audio playback means to emit the name of the corresponding shape located on the sensor, the name of the shape is said in the foreign language and in English
   (d) a power source contained within said toy.

7. The toy according to claim 6 wherein said toy is a doll.

8. The toy according to claim 6 wherein said toy has a flexible body comprising arms, legs, torso and head.

9. The toy according to claim 6 wherein said plurality of words or phrases is repeated twice in a foreign language and twice in English.

10. The toy according to claim 6 wherein said switch is an electro-mechanical switch.

11. A bilingual educational toy for teaching a language comprising:
    (a) at least one sensor or switch located on a portion of said toy;
    (b) an audio playback means within a portion of said toy with a plurality of words or phrases contained thereon in a foreign language and English wherein said audio means is activated by said sensor or switch;
    (c) wings having an upper portion and a lower portion, wherein the wings have a plurality of numbers selected from the group consisting of 1–20, and the sensor, having one of the plurality of numbers located thereon that activates the audio playback means to emit the name of the corresponding number located on the sensor, the name of the number is said in the foreign language and in English,
    (d) a power source contained within said toy.

12. The toy according to claim 11 wherein said toy is a doll.

13. The toy according to claim 11 wherein said toy has a flexible body comprising arms, legs, torso and head.

14. The toy according to claim 11 wherein said plurality of words or phrases is repeated twice in a foreign language and twice in English.

15. The toy according to claim 11 wherein said switch is an electro-mechanical switch.

* * * * *